(12) United States Patent
McCormick et al.

(10) Patent No.: US 7,584,472 B1
(45) Date of Patent: Sep. 1, 2009

(54) METHOD AND APPARATUS FOR PROCESSING CALL SIGNALING MESSAGES

(75) Inventors: James S. McCormick, Stittsville (CA);
David Furshpan, Kfar Saba (IL);
Jonathan Bosloy, Kanata (CA); John Burns, Kanata (CA); Shawn McAllister, Manotick (CA)

(73) Assignee: Alcatel-Lucent Canada Inc., Kanata, Ottawa (CA)

( * ) Notice: Subject to any disclaimer, the term of this patent is extended or adjusted under 35 U.S.C. 154(b) by 0 days.

(21) Appl. No.: 09/246,612

(22) Filed: Feb. 8, 1999
(Under 37 CFR 1.47)

(51) Int. Cl.
*G06F 3/00* (2006.01)
*G06F 9/46* (2006.01)

(52) U.S. Cl. ........................ 718/100; 710/56

(58) Field of Classification Search ................ 709/200, 709/106, 235; 370/200–500; 718/100–108; 379/229–231; 455/401; 710/56
See application file for complete search history.

(56) References Cited

U.S. PATENT DOCUMENTS

| | | | | |
|---|---|---|---|---|
| 4,961,137 A | * | 10/1990 | Augusteijn et al. | 707/206 |
| 5,521,923 A | * | 5/1996 | Willmann et al. | 370/412 |
| 5,999,969 A | * | 12/1999 | Holmes et al. | 709/213 |
| 6,134,216 A | * | 10/2000 | Gehi et al. | 370/231 |
| 6,310,952 B1 | * | 10/2001 | Baldwin et al. | 379/266.01 |
| 6,341,301 B1 | * | 1/2002 | Hagan | 718/100 |

OTHER PUBLICATIONS

IBM Technical Disclosure Bulletin, BSD Socket-based Message Queue IPC System Implementation, Feb. 1992, vol. 34, No. 9, pp. 168-173.*

* cited by examiner

*Primary Examiner*—Van H Nguyen
*Assistant Examiner*—Kenneth Tang (57) ABSTRACT

A method and apparatus for processing call signaling messages during burst overloading and sustained overloading of a communications switch include processing that begins by receiving a plurality of call signaling messages, which may be call set-up messages, connect messages, call proceeding messages, call release messages, release complete messages, and/or link layer information. The processing then continues by comparing a queue occupancy level of a call processing queue with a first queue occupancy threshold. If the queue occupancy level compares unfavorably with the first queue occupancy threshold (e.g., the queue is storing more messages than desired), call signaling messages are enqueued into the call processing queue based on the types of the call signaling messages. For example, dispensable call signaling messages are enqueued in a LIFO manner while indispensable and essential messages are enqueued in a FIFO manner. Dispensable messages are those, that if dropped, have minimal impact on the efficiency of the communication switch and/or do not evoke a time-out process to release whatever communication resources have been allocated to a particular communication set-up request.

30 Claims, 5 Drawing Sheets

METHOD AND APPARATUS FOR PROCESSING CALL SIGNALING MESSAGES

TECHNICAL FIELD OF THE INVENTION

This invention relates generally to communications and more particularly call signaling messages.

BACKGROUND OF THE INVENTION

Communication networks support a multitude of communications between parties. Such communications include voice, data, video, multi-media, e-mail, etc. To initiate a communication, an originating party transmits a communication request, which includes the identity of the originating party, the identity of the destination party or parties, and the type of requested communication, to a local communication processing entity. The local communication processing entity determines, from the communication request, whether the originating party is authentic, whether it is authorized to access the requested type of communication, and whether the destination party is, or parties are, local to the local communication processing entity.

If a destination party is local, the local communication processing entity provides an incoming communication message to the destination party. The destination party responds to the incoming communication message with a communication connect message that is provided to the local communication processing entity. The local communication processing entity, in response to the communication connect message, establishes a communication path between the originating party and the destination party. In addition, the local communication processing entity supports the communication path until a communication end message is received. At this point, the local communication processing entity tears down the communication path.

If one or more of the destination parties is/are not local to the local communication processing entity, the local communication processing entity provides a connection communication setup message to the communication network. The communication network transports, via an intervening switch or a plurality of intervening switches, the communication setup message to a destination local communication processing entity that is affiliated with a destination party. The destination local communication processing entity provides the setup message to the destination party. In response, the destination party provides a communication connect message to the destination local communication processing entity. The destination local communication processing entity then provides the connect message to the originating local communication processing entity via the communication network. In turn, a communication path is established via the intervening switch or switches of the communication network between the originating and destination local processing entities.

Because the communication network can support a multitude of communications, any switch in the network may become overloaded. Such a switch may be a local communication processing entity and/or an intervening switch within the network. An overload condition may be caused by a burst of overhead data and/or sustained amount of overhead data messages that exceeds the switch's capacity. As is known, the overhead data messages include call set-up messages, connect messages, call proceeding messages, call release messages, release complete messages, and link layer information.

One technique to reduce the effects of overloading is to queue, in a first in first out (FIFO) manner, incoming overhead data messages. While FIFO queuing works well for most burst conditions, it adds a latency when the overload is a sustained overload. The latency can rise above a call set-up time-out and may even rise above a connect time out. As such, calls and/or setup messages of calls are dropped.

Another technique for reducing the effects of overloading is to use a last-in-first-out (LIFO) queuing technique as specified in Bell Core TR-PSY-000505 issue 2, section 5.3.8, July 1987. As is known, in a LIFO queuing scheme, the longer an item remains in the queue the less likely it will get processed. But newly received requests, i.e., messages, do not wait long unless it gets bumped for a newer message. As such, when the switch is in a sustained overload, some messages are dropped, but they are the oldest ones in the queue. If the dropped message is a call set-up message, the originating party's request is dropped, requiring the originating party to resend the request. If the dropped message is a connect message, the call is dropped before a communication path is established, which wastes the processing efforts of the switch to establish the call up to this point. In addition, the communication path that was at least partially established, is unusable for other communications until a time out expires. Such a time out is typically ten seconds. If the dropped message is a release message, the links, i.e., the communication resources, comprising the communication path are wasted, i.e., unavailable for reallocation, until a thirty second time out expires. If, the thirty second time-out message is also dropped, the communication resources are permanently hung up.

Another issue with LIFO queuing is multi-party calls and the addition of a party to a multi-party call. For such calls, the LIFO dequeuing process may not enqueue the multi-party call set-up messages in the proper order. As such, certain parties may not be added to the multi-party communication. For example, a typical multi-party communication is established by sending a message identifying a request for a multi-party communication and messages to add the parties. If an add party message is received before the establishment a multi-party communication message is received, the add party message will be dropped, thereby preventing the identified party from participating in the multi-party communication.

Therefore, a need exists for a method and apparatus that processes burst and overload conditions with reduced latency and without dropping messages that, when dropped, waste communication resources.

DETAILED DESCRIPTION OF A PREFERRED EMBODIMENT

Generally, the present invention provides a method and apparatus for processing call signaling messages during burst overloading and sustained overloading of a communications switch. Such processing begins by receiving a plurality of call signaling messages, which may be call set-up messages, connect messages, call proceeding messages, call release messages, release complete messages, link layer information, etc. The processing then continues by comparing a queue occupancy level of a call processing queue with a first queue occupancy threshold. If the queue occupancy level compares unfavorably with the first queue occupancy threshold (e.g., the queue is storing more messages than desired), call signaling messages are enqueued into the call processing queue based on the types of the call signaling messages. For example, dispensable call signaling messages are enqueued in a LIFO manner while indispensable and essential messages are enqueued in a FIFO manner. Dispensable messages are those, that if dropped, have minimal impact on the efficiency of the communication switch and/or do not evoke a time-out process to release whatever communication resources have been allocated to a particular communication set-up request. With such a method and apparatus, burst and/or sustained overload conditions in a communication switch are handled with reduced latency and without dropping call signaling messages that, when dropped, waste communication resources.

Figure 1:
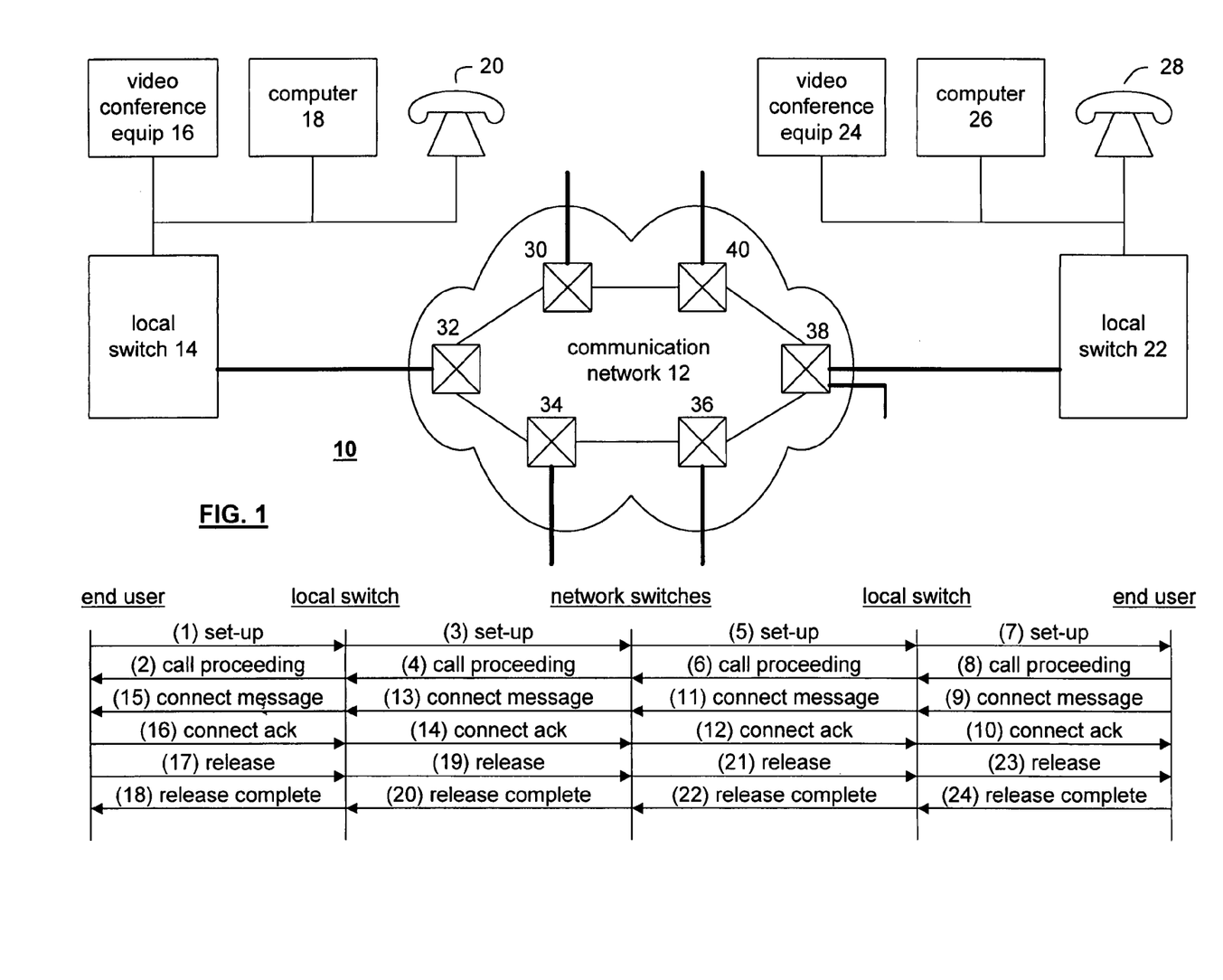
FIG. 1 illustrates a schematic block diagram of a communication network in accordance with the present invention.

The present invention can be more fully described with reference to FIGS. 1 through 6. FIG. 1 illustrates a schematic block diagram of a communication system 10 and associated call signaling messages. The communication system 10 includes a communication network 12 operably coupled to local switches 14 and 22. The local switches 14 and 22 are operably coupled to end user devices such as telephones 20, 28, computers 18, 26 and/or video conferencing equipment 16, 24. The local switches may also be coupled to switching type equipment such as a private branch exchange (PBX), local server, router, etc. The communication network 12 includes a plurality of switches 30-40 that are each coupled to one or more local switches (only local switches 14 and 22 are shown). The switches 30-40 are intervening switches between local switch 14 and local switch 22. In practice, the switches 30-40 and the local switches 14 and 22 may be of the same type such as frame relay switches, ATM switches, etc. manufactured and distributed by Newbridge Networks Corporation.

To establish a communication between end-users, for example between an end user associated with local switch 14 and an end user associated with local switch 22, an originating end user transmits a set up message to the local switch. This is illustrated in the switch relay diagram portion of FIG. 1. Note that the numbers in parentheticals indicate the ordering of call signaling messages. As such, a communication begins when the originating party, or end-user 16-20 or 24-28, sends a call set-up message to its local switch 14 or 22. The local switch 14 or 22 provides a call proceeding message to the end user and also relays the setup message to a network switches. The network switches provide a call proceeding message to the originating local switch and also provides the call set-up message to the destination local switch. As one of average skill in the art will appreciate, the network switches may be a single switch within the network or a plurality of switches, depending on communication path routing conventions within the network. As one of average skill in the art will also appreciate, each switch in the network may provide a call proceeding message to a previous switch and relay the call set-up message to a subsequent switch.

Upon receiving the set-up message, the destination local switch provides a call proceeding message to the network switches and provides the call set-up message to the destination end user. In response, the destination end-user provides a connect message to the destination local switch which provides the connect message to the network switches and a connect acknowledge message to the destination end user. The network switches provide the connect message to the originating local switch and the connect acknowledge message to the destination local switch. The originating local switch then provides the connect message to the originating end-user, which, in turn, provides the connect acknowledge message to the originating local switch. At this point, a communication path is established between the end-users and remains intact until one of the parties initiate a release message.

In this illustration, the originating end-user initiates the release message, which it provides to the originating local switch. The originating local switch relays the release message to the network switches and provides a release complete message to the origination end user. The network switches relay the release message to the destination local switch and provide a release complete message to the originating local switch. The destination local switch relays the release message to the destination end-user and provides a release complete message to the network switches. Upon receiving the release message, the destination end user provides a release complete message to the destination local switch. At this point, the communication path between the originating end-user and destination end-user is completely torn down. Note that this example call set up and tear down process is at least one methodology specified in the DSS2 UNI specification for call/connection control, referenced as ITU-T Q.2931.

Figure 2:
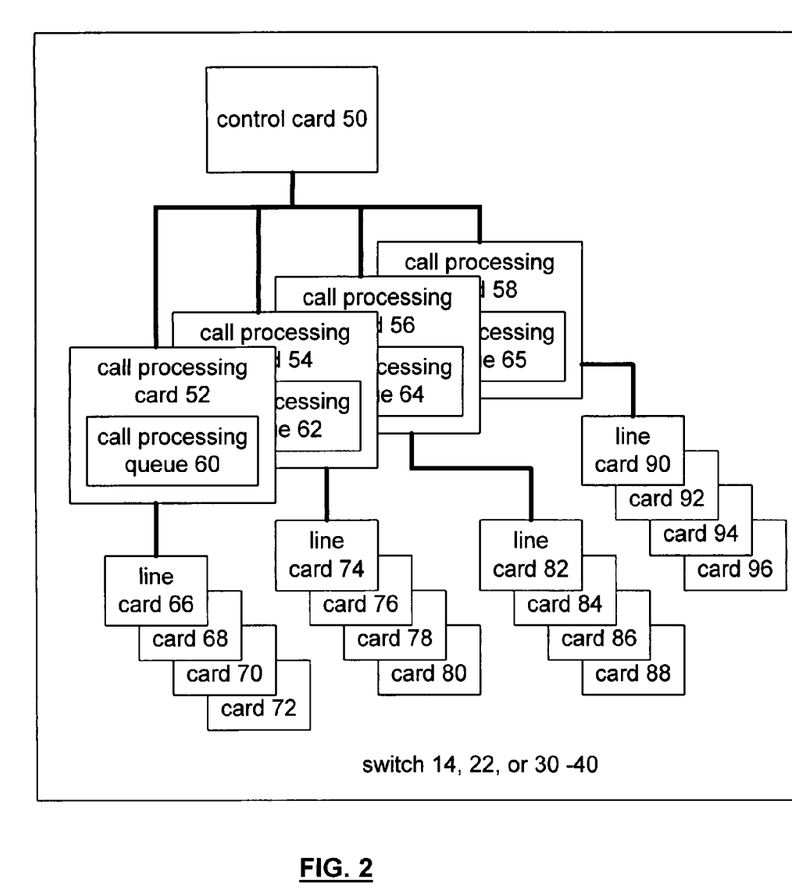
FIG. 2 illustrates a schematic block diagram of a switch in accordance with the present invention.

FIG. 2 illustrates a schematic block diagram of an intervening switch 30-40 and/or local switch 14, 22. The switch includes a control card 50, a plurality of call processing cards 52-58 and a plurality of line cards 66-96. As shown, each of the call processing cards 52-58 includes a call processing queue 60-64 and further includes a call signal processing module 100 or the equivalent functionality thereof. Each of the call processing cards 52-58 is associated with a plurality of line cards 66-72, 74-80, 82-88, and 90-96. As is known, each line card supports a standardized communication interface, a portion thereof, or multiple interfaces. Such interfaces includes T1 links, E1 links, OC3 links, T3 links, E3 links, STM1 links, OC12 links, etc. The call processing queue 60, 62, 64, 65 of the call processing card 52, 54, 56 and 58 enqueues the call signaling messages of each associated line card. As such, the call processing queue 60, 62, 64, 65 may include a single queue that is used for each of the line cards or a separate queue, one for each line card. As one of average skill in the art will appreciate, the illustrated switch architecture is one of many possible architectures. For example, the control functionality and the call processing functionality may be implemented on a single card that supports all of the line cards, or may be implemented on several cards, each supporting a group of line cards. In addition, the switch may be implemented with a single call processing queue.

In operation, the call processing card 52 determines whether calls for a particular line card are in a sustained and/or overload condition. Such a determination may be made by comparing queue occupancy level (i.e., the percentage of messages currently stored within the queue with respect to the total number of messages the queue is capable of storing) to a queue occupancy threshold, or thresholds. If the queue occupancy level exceeds a first queue occupancy threshold, the call processing card enqueues call signaling messages such that dispensable messages are dequeued using a LIFO dequeuing technique and indispensable and essential messages are dequeued using a FIFO dequeuing technique.

The LIFO and FIFO dequeuing techniques are performed using dequeuing lists, which are discussed below with reference to FIG. 4. As one of average skill in the art would expect, the value of the first queue occupancy threshold is dependent upon the typical type of overloading within the switch. As such, the first queue occupancy threshold may be set between zero and one hundred percent of the queue's capacity. For example, for a switch that almost always experiences sustained overloading, the first occupancy threshold may be set at, or near, zero percent (i.e., use LIFO almost all the time for dispensable messages). Conversely, if the switch almost always experiences burst overloading, the first occupancy threshold may be set at, or near, one hundred percent (i.e., use FIFO almost all the time for dispensable messages). Note that a switch may employ such enqueuing and dequeuing techniques in the transmit and/or receive path.

The call processing cards each include a plurality of dequeuing lists to track the call signaling messages and their particular type or status. Such dequeuing will also be described in greater detail with reference to FIG. 4. The functionality of the call processing card with respect to processing overload conditions will be discussed in greater detail with reference to FIGS. 4 through 6.

Figure 3:
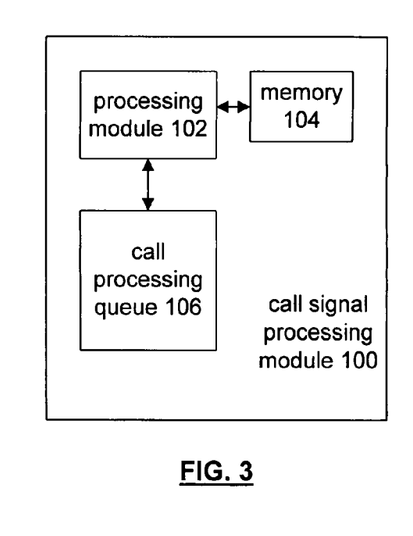
FIG. 3 illustrates a schematic block diagram of a call signal processing module in accordance with the present invention.

FIG. 3 illustrates a schematic block diagram of a call signal processing module 100 that includes a processing module 102, memory 104, and a call processing queue 106. The processing module 102 may be a single processing entity or a plurality of processing entities. Such a processing entity may be a microprocessor, microcontroller, digital signal processor, central processing unit, microcomputer, state machine, logic circuitry and/or any device that manipulates digital information based on operational instructions. The memory 104 may be a single memory device or a plurality of memory devices. The memory device may be random access memory, read-only memory, floppy disk memory, system disk memory, hard drive memory, external magnetic tape memory, CD ROM, and/or any device that stores digital information that is retrievable. Note that when the processing module implements one or more of its functions utilizing a state machine and/or logic circuitry, the memory containing the corresponding instructions is embedded within the circuitry comprising the state machine and/or logic circuitry. The operational instructions stored in memory 104 and executed by processing module 102 will be discussed in greater detail with reference to FIGS. 5 and 6.

Figure 4:
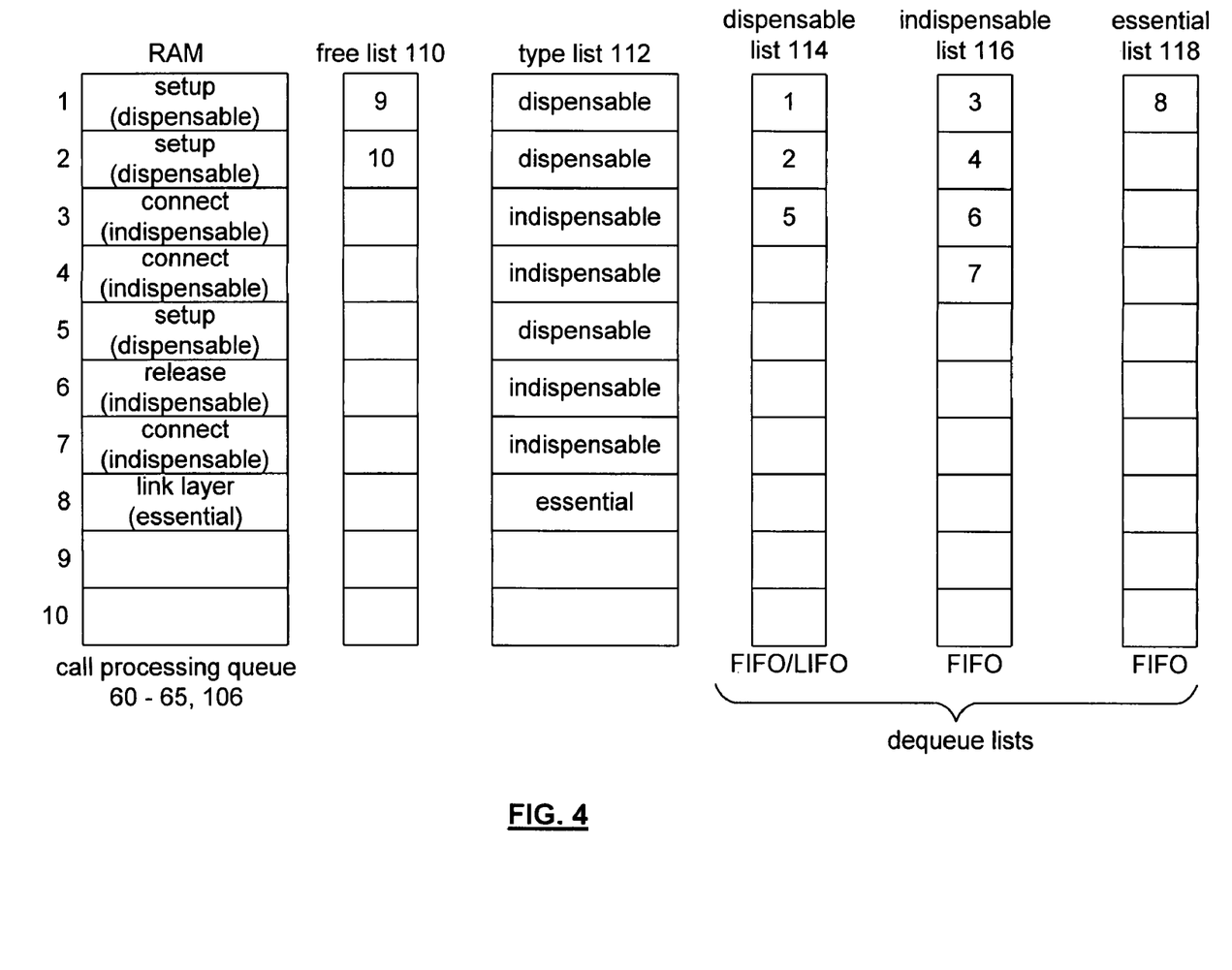
FIG. 4 illustrates a graphical representation of call signal processing queues in accordance with the present invention.

FIG. 4 illustrates a graphical representation of the call processing queue 60-65 and 106 and a plurality of dequeuing lists. The dequeuing lists include a free-list 110, a type list 112, a dispensable list 114, an indispensable list 116, and an essential list 118. In this illustration, the call processing queue 60-65 and 106 includes 10 locations. Of the 10 locations, the first eight include a call signaling message, while locations 9 and 10 are empty. The free list 110 includes the address of each of the entries within the call processing queue that are free (9 and 10, in this example). As such, as a call signaling message is removed from the call processing queue, the corresponding address is added to the free list 110. Conversely, when an entry is added into the call processing queue, the free list is addressed to identify a free location within the call processing queue and when data is entered therein, the corresponding address is removed from the free list.

The type list 112 identifies the particular types of call signaling messages that have been received and in what order. Such call signaling message types include dispensable, indispensable, and essential. For example, call set-up messages may be dispensable, link layer information may be essential, and other call signaling messages may be indispensable. As one of average skill in the art would appreciate, the assignment of the types of the call signaling messages as being dispensable, indispensable and essential may vary depending on the desired operation of the system.

To dequeue the call signaling messages from the call processing queue, the dequeuing lists are utilized. The dequeuing process begins by determining the first entry in the type list 112. As shown, this entry is a dispensable call signaling message. As such, the dispensable list 114 is accessed. Depending on whether the dequeuing is established as a FIFO or a LIFO, a particular dispensable call signaling message would be dequeued from the call processing queue. The dispensable list 114 will operate in a FIFO manner as long as the switch is in a non-overload condition. When the switch enters an overload condition, the dispensable list is accessed in a LIFO manner, while the indispensable list 116 and the essential list 118 are accessed in a FIFO manner. The remaining call signaling messages would be retrieved from the queue based on the type and order in which they were received. As one of average skill in the art will appreciate, the indispensable list 116 and the essential list 118 can be combined into a single list. The utilization of the call processing queue and the dequeuing list can be discussed in greater detail with reference to FIGS. 5 and 6.

Figure 5:
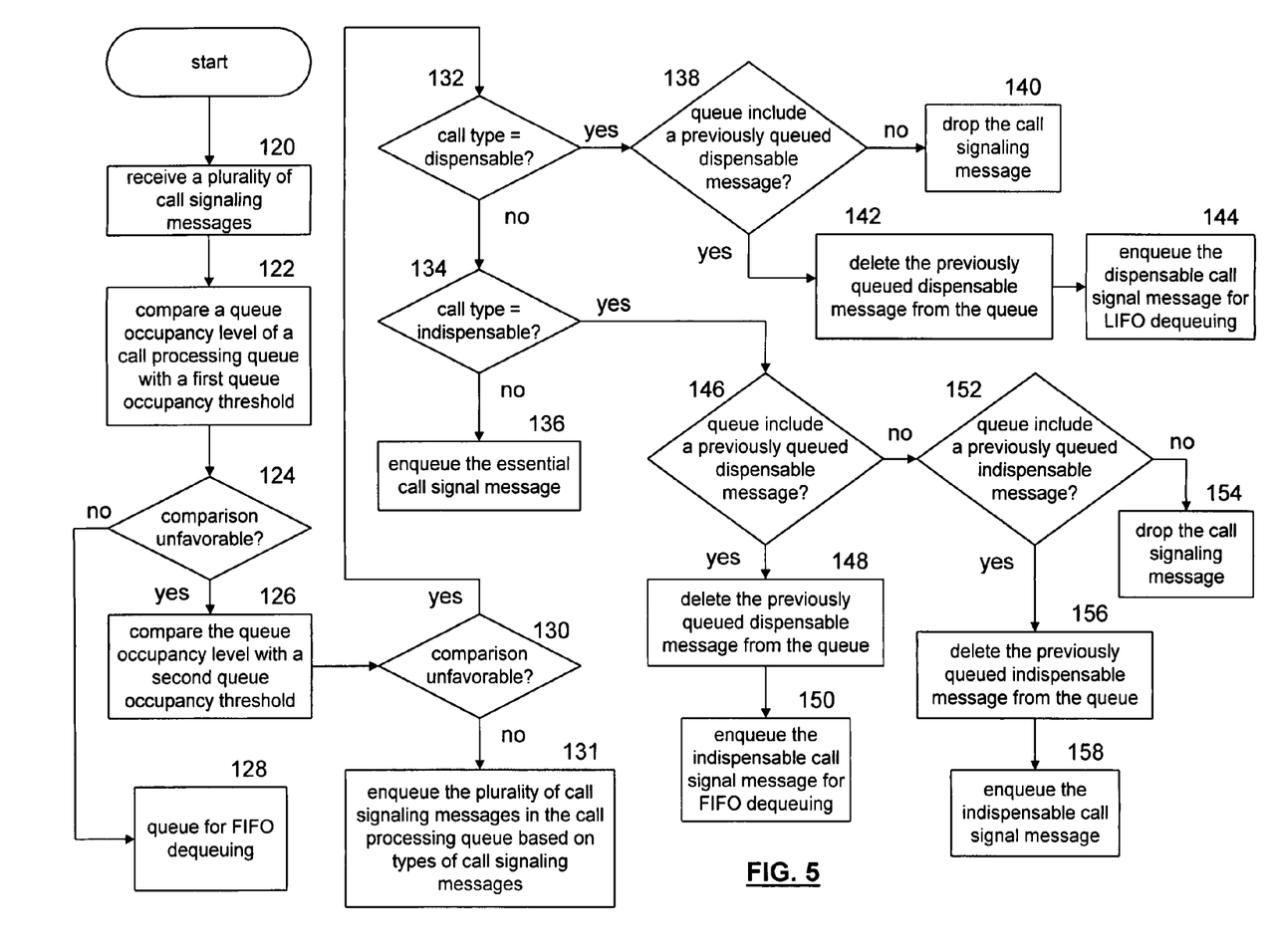
FIG. 5 illustrates a logic diagram of a method for processing call signaling messages in accordance with the present invention.

FIG. 5 illustrates a logic diagram of a method for processing call signaling messages. The processing begins at step 120 where a plurality of call signaling messages is received. The call signaling messages include dispensable messages, indispensable messages, and essential messages. The process then proceeds to step 122 where a queue occupancy level of a call processing queue, which is storing the call signaling messages as they are received, is compared with a first queue occupancy threshold. The first threshold may be set depending on the desired overload operation of the switch and/or on whether the data is received in a more consistent manner or in a burst manner. If in a burst manner, the first threshold would be set to a higher value than when the messages are received in a more consistent, sustained overload, manner.

The process then proceeds to step 124 where a determination is made as to whether the comparison at step 122 was unfavorable. If the comparison was not unfavorable, i.e., the queue occupancy level is less than the first queue occupancy threshold, the process proceeds to step 128. At step 128, the call processing queue is enqueued such that the call signaling messages may be dequeued in a FIFO manner.

If the comparison at step 124 was unfavorable, the process proceeds to step 126. At step 126, the queue occupancy level is compared with a second queue occupancy threshold. The second queue occupancy level threshold will be set at a value greater than or equal to the first queue occupancy threshold and may be set at the maximum capacity of the queue or some portion thereof. The process then proceeds to step 130 where a determination is made as to whether the comparison at step 130 was unfavorable.

If the comparison at step 130 was not unfavorable, i.e., the queue occupancy level is greater than or equal to the first queue occupancy threshold but less than the second queue occupancy threshold, the process proceeds to step 131. At step 131, the plurality of call signaling messages are enqueued into the call processing queue based on the types of call signaling messages. For example, when the received call signaling message is a dispensable message, a previously queued dispensable message is deleted from the call processing queue if such a message exists. The newly received dispensable call signal message is then stored in the call processing queue. If a previously queued dispensable message does not exist within the call processing queue, the newly received dispensable call signaling message is dropped. For example, if the currently received message is a call setup message, a previously queued call setup message will be deleted and the newly received one will be added to the call processing queue. If, however, a previously stored call setup message does not exist in the call processing queue, the newly received call setup message will be dropped. If, the newly received call signaling message is an indispensable message or an essential message, the newly received call signaling message is enqueued into the call processing queue. Note that to delete a previously queued dispensable message, the dispensable list 114, as shown in FIG. 4, is accessed to determine if a dispensable message is currently enqueued. In addition, the dispensable list 114 is accessed to determine the oldest dispensable list in the message, which will typically be the message deleted.

If the comparison at step 130 was unfavorable (i.e., the queue occupancy level is above the first and second queue occupancy level thresholds), the process proceeds to step 132. At step 132 a determination is made as to whether the call type of the call signaling message is dispensable. If not, the process proceeds to step 134 where a determination is made as to whether the call type of the current call signaling message is indispensable. If not, the process proceeds to step 136 where the newly received call signaling message is an essential call signaling message and such message is enqueued such that it may be dequeued in a FIFO manner. Note that if the queue is completely full, a dispensable message will be deleted to make room for the essential message. If a dispensable message is not queued, an indispensable message will be deleted.

If the call type of the call signaling message is dispensable, the process proceeds to step 138 where a determination is made as to whether the call processing queue includes a previously queued dispensable message. If not, the process proceeds to step 140 where the newly received call signaling message is dropped. If, however, the queue includes a previously queued dispensable message, the process proceeds to step 142. At step 142 the previously queued dispensable message is deleted from the queue. The process then proceeds to step 144 where the newly received dispensable call signaling message is enqueued into the call processing queue.

If the newly received call signaling message is an indispensable message, the process proceeds to step 146. At step 146, a determination is made as to whether the call processing queue currently includes a queued dispensable message. If so, the process proceeds to step 148 where the previously queued dispensable message is deleted from the queue. The process then proceeds to step 150 where the newly received indispensable call signaling message is enqueued into the call processing queue.

If, however, the queue does not include a currently enqueued dispensable message the process proceeds to step 152. At step 152 a determination is made as to whether the queue includes a previously queued indispensable message. If not, the process proceeds to step 154 where the newly received indispensable call signaling message is dropped. If, however, the queue includes a previously queued indispensable message, the process proceeds to step 156 where such a message is deleted from the queue. The process then proceeds to step 158 where the newly received indispensable call signaling message is enqueued into the call processing queue.

Figure 6:
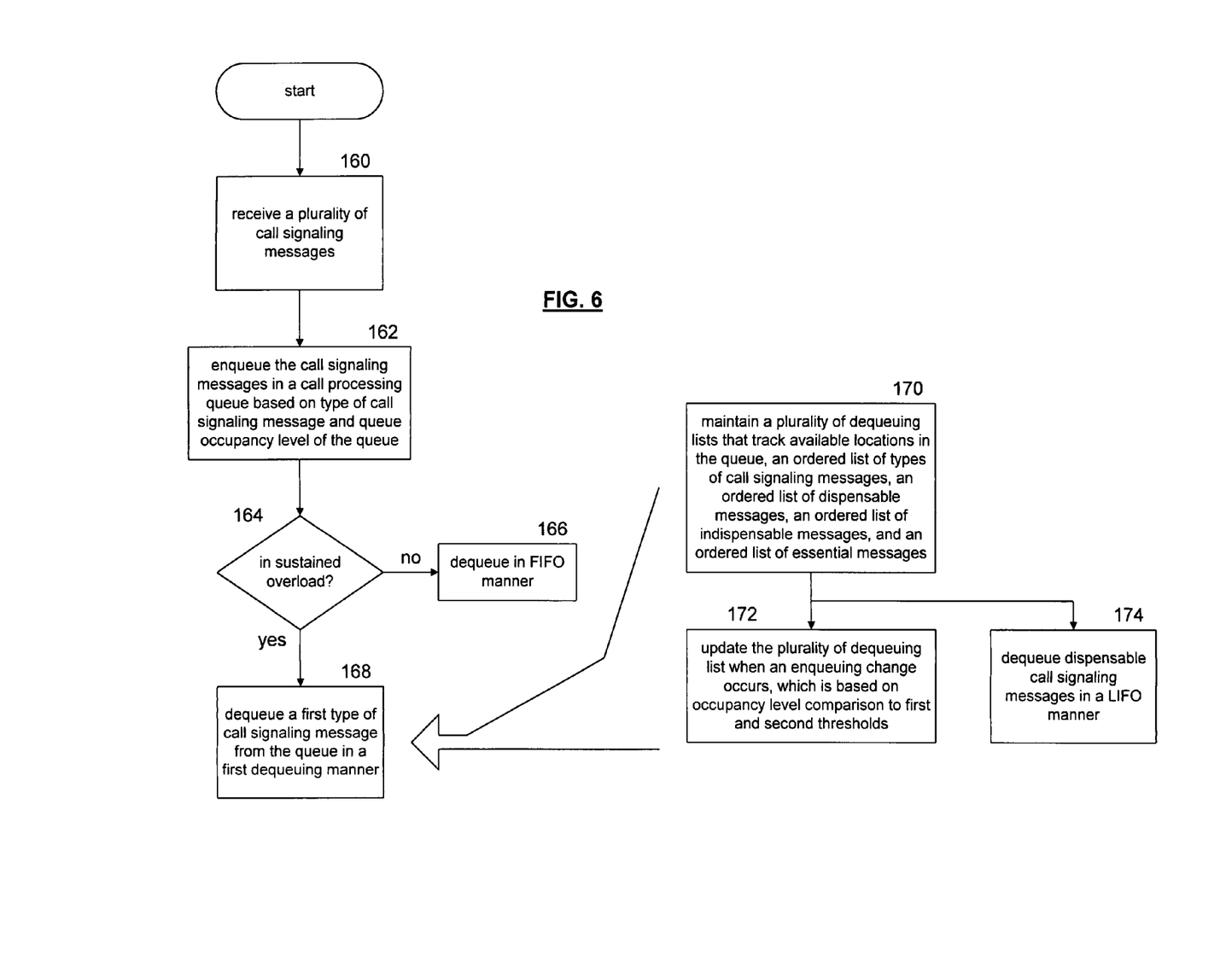
FIG. 6 illustrates a logic diagram of an alternate method for processing call signaling messages in accordance with the present invention.

FIG. 6 illustrates a logic diagram of an alternate method for processing call signaling messages. The process begins at step 160 where a plurality of call signaling messages are received. The process then proceeds to step 162 where the call signaling messages are enqueued into a call processing queue based on the type of call signaling messages being received and the queue occupancy level of the queue. The process then proceeds to step 164 where a determination is made as to whether the queue is in a sustained overload condition. If not, the process proceeds to step 166 where the call signaling messages are dequeued from the call processing queue in a FIFO manner.

If, however, the switch is in a sustained overload condition, the process proceeds to step 168. At step 168, a first type of call signaling messages are dequeued from the queue in a first dequeuing manner while other call signaling messages are dequeued in a second dequeuing manner. Steps 170 through 174 further describe the processing done at step 168. At step 170, a plurality of dequeuing lists are maintained. The dequeuing lists track available locations in the queue, an order list of the types of call signaling messages, an order list of dispensable messages, an ordered list of indispensable messages, and an order list of essential messages. Such dequeuing lists were illustrated in FIG. 4. The process then proceeds to step 172 where the plurality of dequeuing lists are updated when an enqueuing change occurs. The updating is based on an occupancy level comparison to first and second queue occupancy thresholds. The updating is based on dequeuing messages from the call processing queue. As such, the dequeuing lists are utilized to determine which call signaling messages are to be dequeued from the call processing queue and in what order.

If the switch is in a non-overload condition, the call signaling messages are dequeued in a FIFO manner. If, however, the switch is in an overload condition, the dispensable messages are dequeued in a LIFO manner. Note that a delay may be added such that the switching of dequeuing of the dispensable messages from the FIFO manner to the LIFO manner avoids an unstable condition. For example, it would be desirable to avoid a constant switching between LIFO dequeuing of dispensable messages and a FIFO dequeuing of dispensable messages. In addition, the delay allows bursts of messages to be dequeued in a FIFO manner, without first transitioning to a LIFO dequeuing process.

At step 174, the dispensable call signaling messages are dequeued in a LIFO manner when the switch is in the sustained overload condition. As such, depending on the type of the overload condition, call signaling messages are dequeued in a FIFO manner and/or LIFO manner to reduce latency and to drop only messages that minimally waste communication resources.

The preceding discussion has presented a method and apparatus for processing call signaling messages in a communication system. By implementing a call signal processing module in a switch or multiple modules in a switch, overload conditions may be processed with reduced latency and with reduced waste of communication resources. By dropping dispensable call signaling messages when in an overload condition, the latency is reduced as well as the wasting of resources due to dropped messages.

What is claimed is:

1. A method for processing call signaling messages, the method comprises the steps of:
   a) receiving a plurality of call signaling messages;
   b) comparing a queue occupancy level of a call processing queue with a first queue occupancy threshold; and
   c) when queue occupancy level compares unfavorably with the first queue occupancy threshold, enqueuing the plurality of call signaling messages into the call processing queue based on types of call signaling messages, wherein the types of call signaling messages include dispensable messages and indispensable messages, wherein step (c) further comprises:

when a call signaling message of the plurality of call signaling messages is a dispensable message, deleting from the call processing queue a previously queued dispensable message when the previously dispensable message exists;

enqueuing the call signaling message into the call processing queue when the previously queued dispensable message is deleted; and when the call signaling message is an indispensable message, enqueuing the call signaling message into the call processing queue; and when the previously queued dispensable message does not exist and when the call signaling message is a dispensable message, dropping the call signaling message.

2. The method of claim 1 further comprises, when in a sustained overloading condition, dequeuing dispensable call signaling messages in a first dequeuing manner from the call processing queue.

3. The method of claim 2, the first dequeuing manner further comprises at least one of FIFO and LIFO.

4. The method of claim 1 further comprises:
maintaining a plurality of dequeuing lists, wherein the plurality of dequeuing lists track available locations in the call processing queue, an ordered list of types of call messages, an ordered list of dispensable messages, and an ordered list of indispensable messages.

5. The method of claim 4 further comprises updating the plurality of dequeuing lists when enqueuing changes occur, wherein the enqueuing changes occur when the queue occupancy level compares unfavorably with the first queue occupancy threshold or when the queue occupancy level compares unfavorably with a second queue occupancy threshold.

6. The method of claim 4 further comprises dequeuing dispensable call messages from the call processing queue in a LIFO manner based on the ordered list of dispensable messages when in a sustained overloading condition.

7. A method for processing call signaling messages, the method comprises the steps of:
receiving a plurality of call signaling messages;
comparing a queue occupancy level of a call processing queue with a first queue occupancy threshold; and
when queue occupancy level compares unfavorably with the first queue occupancy threshold, enqueuing the plurality of call signaling messages into the call processing queue based on types of call signaling messages;
comparing the queue occupancy level with a second queue occupancy threshold;
when the queue occupancy level compares unfavorably with the second queue occupancy threshold:
when a call signaling message of the plurality of call signaling messages is a dispensable message or an indispensable message, deleting from the call processing queue a previously queued dispensable message when the previously dispensable message exists;
enqueuing the call signaling message into the call processing queue when the previously queued dispensable message is deleted; and
when the previously queued dispensable message does not exist and when the call signaling message is a dispensable message, dropping the call signaling message.

8. A method for processing call signaling messages, the method comprises the steps of:
receiving a plurality of call signaling messages;
comparing a queue occupancy level of a call processing queue with a first queue occupancy threshold; and
when queue occupancy level compares unfavorably with the first queue occupancy threshold, enqueuing the plurality of call signaling messages into the call processing queue based on types of call signaling messages;
comparing the queue occupancy level with a second queue occupancy threshold;
when the queue occupancy level compares unfavorably with the second queue occupancy threshold:
when a call signaling message of the plurality of call signaling messages is a dispensable message or an indispensable message, deleting from the call processing queue a previously queued dispensable message when the previously dispensable message exists and enqueuing the call signaling message into the call processing queue when the previously queued dispensable message is deleted;
when the previously queued dispensable message does not exist and when the call signaling message is an indispensable message, deleting from the call processing queue a previously queued indispensable message when the previously indispensable message exists and enqueuing the call signaling message into the call processing queue when the previously queued indispensable message is deleted; and
when the previously queued dispensable message does not exist, when the previously queued indispensable message does not exist and when the call signaling message is an indispensable message, dropping the call signaling message.

9. A method for processing call signaling messages, the method comprises the steps of:
receiving a plurality of call signaling messages;
enqueuing the plurality of call signaling messages into a call processing queue based on type of call signaling messages and queue occupancy level of the call processing queue;
when in a sustained overload condition, dequeuing a first type of call signaling message from the call processing queue in a first dequeuing manner; and
maintaining a plurality of dequeuing lists, wherein the plurality of dequeuing lists track available locations in the call processing queue, an ordered list of types of call signaling messages, an ordered list of dispensable messages, and an ordered list of indispensable messages.

10. The method of claim 9, wherein the types of call signaling messages include dispensable messages and indispensable messages.

11. The method of claim 10 further comprises:
when the queue occupancy level compares unfavorably to a first queue occupancy threshold:
when a call signaling message of the plurality of call signaling messages is a dispensable message, deleting from the call processing queue a previously queued dispensable message when the previously dispensable message exists;
enqueuing the call signaling message into the call processing queue when the previously queued dispensable message is deleted; and
when the call signaling message is an indispensable message, enqueuing the call signaling message into the call processing queue.

12. The method of claim 10 further comprises:
comparing the queue occupancy level with a second queue occupancy threshold;
when the queue occupancy level compares unfavorably with the second queue occupancy threshold:

when a call signaling message of the plurality of call signaling messages is a dispensable message or an indispensable message, deleting from the call processing queue a previously queued dispensable message when the previously dispensable message exists;

enqueuing the call signaling message into the call processing queue when the previously queued dispensable message is deleted.

13. The method of claim 12 further comprises:

when the previously queued dispensable message does not exist and when the call signaling message is an indispensable message, deleting from the call processing queue a previously queued indispensable message when the previously indispensable message exists; and enqueuing the call signaling message into the call processing queue when the previously queued indispensable message is deleted.

14. The method of claim 9 further comprises updating the plurality of dequeuing lists when enqueuing changes occur, wherein the enqueuing changes occur when the queue occupancy level compares unfavorably with a first queue occupancy threshold or when the queue occupancy level compares unfavorably with a second queue occupancy threshold.

15. The method of claim 9 further comprises dequeuing dispensable call messages from the call processing queue in a LIFO manner based on the ordered list of dispensable messages when in a sustained overloading condition.

16. A call signal processing module comprises:

a call processing queue;

a processing module; and memory operably coupled to the processing module, wherein the memory stores operational instructions that cause the processing module to: receive a plurality of call signaling messages; compare a queue occupancy level of the call processing queue with a first queue occupancy threshold; enqueue, when queue occupancy level compares unfavorably with the first queue occupancy threshold, the plurality of call signaling messages into the call processing queue based on types of call signaling messages; compare the queue occupancy level with a second queue occupancy threshold; when the queue occupancy level compares unfavorably with the second queue occupancy threshold: delete a previously queued dispensable message from the call processing queue when a call signaling message of the plurality of call signaling messages is a dispensable message or an indispensable message and when the previously dispensable message exists; enqueue the call signaling message into the call processing queue when the previously queued dispensable message is deleted; and drop the call signaling message when the previously queued dispensable message does not exist and when the call signaling message is a dispensible message.

17. The call signal processing module of claim 16, wherein the types of call signaling messages include dispensable messages and indispensable messages.

18. The call signal processing module of claim 16, wherein the memory further comprises operational instructions that cause the processing module to:

enqueue the call signaling message into the call processing queue when the call signaling message is an indispensable message.

19. The call signal processing module of claim 16, wherein the memory further comprises operational instructions that cause the processing module to:

delete a previously queued indispensable message from the call processing queue when the previously dispensable message does not exist and when the call signaling message is an indispensable message and when the previously indispensable message exists; and enqueue the call signaling message into the call processing queue when the previously queued indispensable message is deleted.

20. The call signal processing module of claim 16, wherein the memory further comprises operational instructions that cause the processing module to:

dequeue dispensable call signaling messages in a first dequeuing manner from the call processing queue when in a sustained overloading condition.

21. The call signal processing module of claim 16, wherein the memory further comprises operational instructions that cause the processing module to:

maintain a plurality of dequeuing lists, wherein the plurality of dequeuing lists track available locations in the call processing queue, an ordered list of types of call messages, an ordered list of dispensable messages, and an ordered list of indispensable messages.

22. The call signal processing module of claim 21, wherein the memory further comprises operational instructions that cause the processing module to:

update the plurality of dequeuing lists when enqueuing changes occur, wherein the enqueuing changes occur when the queue occupancy level compares unfavorably with the first queue occupancy threshold or when the queue occupancy level compares unfavorably with a second queue occupancy threshold.

23. The call signal processing module of claim 16, wherein the memory further comprises operational instructions that cause the processing module to:

dequeue dispensable call messages from the call processing queue in a LIFO manner based on the ordered list of dispensable messages when in a sustained overloading condition.

24. A call signal processing module comprises:

a call processing queue;

a processing module; and memory operably coupled to the processing module, wherein the memory stores operational instructions that cause the processing module to: receive a plurality of call signaling messages; enqueue the plurality of call signaling messages into the call processing queue based on type of call signal messages and queue occupancy level of the call processing queue; dequeue a first type of call signal message from the call processing queue in a first dequeuing manner when in a sustained overload condition; and maintain a plurality of dequeuing lists, wherein the plurality of dequeuing lists track available locations in the call processing queue, an ordered list of types of call messages, an ordered list of dispensable messages, and an ordered list of indispensable messages, wherein the types of call signaling messages include dispensable messages and indispensable messages.

25. The call signal processing module of claim 24, wherein the memory further comprises operational instructions that cause the processing module to:

when the queue occupancy level compares unfavorably to a first queue occupancy threshold:

delete from the call processing queue a previously queued dispensable message when a call signaling message of the plurality of call signaling messages is a dispensable message and when the previously dispensable message exists;

enqueue the call signaling message into the call processing queue when the previously queued dispensable message is deleted; and enqueue the call signaling message into the call processing queue when the call signaling message is an indispensable message.

26. The call signal processing module of claim 24, wherein the memory further comprises operational instructions that cause the processing module to:

compare the queue occupancy level with a second queue occupancy threshold;

when the queue occupancy level compares unfavorably with the second queue occupancy threshold:

delete a previously queued dispensable message from the call processing queue when a call signaling message of the plurality of call signaling messages is a dispensable message or an indispensable message and when the previously dispensable message exists;

enqueue the call signaling message into the call processing queue when the previously queued dispensable message is deleted.

27. The call signal processing module of claim 26, wherein the memory further comprises operational instructions that cause the processing module to:

delete from the call processing queue a previously queued indispensable message when the previously queued dispensable message does not exist and when the call signaling message is an indispensable message and when the previously indispensable message exists; and enqueue the call signaling message into the call processing queue when the previously queued indispensable message is deleted.

28. The call signal processing module of claim 24, wherein the memory further comprises operational instructions that cause the processing module to: update the plurality of dequeuing lists when enqueuing changes occur, wherein the enqueuing changes occur when the queue occupancy level compares unfavorably with a first queue occupancy threshold or when the queue occupancy level compares unfavorably with a second queue occupancy threshold.

29. The call signal processing module of claim 24, wherein the memory further comprises operational instructions that cause the processing module to: dequeue dispensable call messages from the call processing queue in a LIFO manner based on the ordered list of dispensable messages when in a sustained overloading condition.

30. The method of claim 24, wherein the first dequeuing manner further comprises at least one of FIFO and LIFO.

* * * * *